United States Patent
Krake et al.

(10) Patent No.: US 8,286,661 B2
(45) Date of Patent: Oct. 16, 2012

(54) BI-DIRECTIONAL OVERPRESSURE SHUT-OFF VALVE

(75) Inventors: Bradley Krake, San Diego, CA (US); Cecilia Lam, Scottsdale, AZ (US); Anthony Matarazzo, Queen Creek, AZ (US); Kenneth Roberts, Phoenix, AZ (US); Paul Banta, Avondale, AZ (US)

(73) Assignee: Honeywell International Inc., Morristown, NJ (US)

( * ) Notice: Subject to any disclaimer, the term of this patent is extended or adjusted under 35 U.S.C. 154(b) by 506 days.

(21) Appl. No.: 12/472,231

(22) Filed: May 26, 2009

(65) Prior Publication Data

US 2010/0301238 A1    Dec. 2, 2010

(51) Int. Cl.
*F16K 31/122* (2006.01)
(52) U.S. Cl. ............... 137/487; 137/487.5; 137/488
(58) Field of Classification Search ............ 137/485, 137/486, 487, 487.5, 488, 489, 489.5, 492, 137/492.5
See application file for complete search history.

(56) References Cited

U.S. PATENT DOCUMENTS

| | | | | |
|---|---|---|---|---|
| 3,119,409 A * | 1/1964 | Allan | | 137/488 |
| 3,433,251 A * | 3/1969 | Avant | | 137/488 |
| 3,769,998 A * | 11/1973 | Avant | | 137/116.5 |
| 4,532,390 A | 7/1985 | Gallone | | |
| 4,617,958 A * | 10/1986 | Seidel et al. | | 137/492.5 |
| 5,035,582 A | 7/1991 | Carroll et al. | | |
| 5,639,224 A | 6/1997 | Schlossarczyk et al. | | |
| 6,694,746 B2 * | 2/2004 | Reed et al. | | 60/787 |
| 7,066,710 B2 * | 6/2006 | Wiggins et al. | | 415/19 |
| 2008/0197010 A1 | 8/2008 | Lin | | |

* cited by examiner

*Primary Examiner* — Dinh Q Nguyen
*Assistant Examiner* — Viet Le
(74) *Attorney, Agent, or Firm* — Ingrassia Fisher & Lorenz, P.C.

(57) ABSTRACT

A valve assembly includes a valve body, a valve element, a valve actuator, and a fluid-operated switch. The valve body defines a flow passage. The valve element is disposed at least partially within the flow passage and is moveable between an open position and a closed position. The valve actuator is coupled to the valve element and is responsive to pressurized fluid supplied thereto and vented therefrom to move the valve element between the open position and the closed position, respectively. The fluid-operated switch has a first fluid inlet, a second fluid inlet, a third fluid inlet, an actuator port, and an actuator vent port. The fluid-operated switch is in fluid communication with the valve actuator and is operable to selectively supply pressurized fluid to the actuator via the actuator port, and vent the pressurized fluid from the actuator via the actuator port and the actuator vent port.

17 Claims, 2 Drawing Sheets

BI-DIRECTIONAL OVERPRESSURE SHUT-OFF VALVE

TECHNICAL FIELD

The present invention generally relates to fluid-operated valves, and more particularly relates to a fluid-operated valve that includes a back-up shut-off capability to protect downstream components.

BACKGROUND

Valves are used in myriad systems and environments, and may be operated in numerous and varied ways. Some valves are manually operated, others are operated via electrical, hydraulic, pneumatic, or various other types of actuators. In one particular implementation, a flow control valve is installed in an aircraft environmental control system. In such an implementation, the flow control valve is operated via a pneumatic actuation device that will open the flow control valve upon receipt of pressurized air upstream of the flow control valve. It may additionally be desirable, in such implementations, that the flow control valve include a shut-off mechanism that prevents downstream flow ducts from reaching or exceeding a particular pressure.

There is presently a desire for a control valve, which may be used in an aircraft environmental control system, that is normally-closed, is capable of being opened with pressure from either upstream or downstream of the control valve, is capable of being closed upon receipt of a suitable electrical signal, implements a backup means of closing if the electrical signal is not received, and is able to in the event that upstream pressure exceeds the electrical or backup closing setpoint. Unfortunately, there is no known valve that implements all of these functions.

Hence, there is a need for a flow control valve that implements the functionality described above. The present invention addresses at least this need.

BRIEF SUMMARY

In one embodiment, a valve assembly includes a valve body, a valve element, a valve actuator, and a fluid-operated switch. The valve body defines a flow passage having at least an inlet port and an outlet port. The valve element is disposed at least partially within the flow passage and is moveable between an open position and a closed position. The valve actuator is coupled to the valve and is responsive to pressurized fluid supplied thereto and vented therefrom to move the valve element between the open position and the closed position, respectively. The fluid-operated switch has a first fluid inlet, a second fluid inlet, a third fluid inlet, an actuator port, and an actuator vent port. The fluid-operated switch is in fluid communication with the valve actuator and is operable to selectively supply pressurized fluid to the actuator via the actuator port, and vent the pressurized fluid from the actuator via the actuator port and the actuator vent port.

In another embodiment, a valve assembly includes a valve body, a valve element, a valve actuator, a shuttle valve housing, a shuttle element, and a fluid-operated switch. The valve body defines a flow passage having at least an inlet port and an outlet port. The valve element is disposed at least partially within the flow passage and is moveable between an open position and a closed position. The valve actuator is coupled to the valve and is responsive to pressurized fluid supplied thereto and vented therefrom to move the valve element between the open position and the closed position, respectively. The shuttle valve housing has a first fluid port in fluid communication with the valve body flow passage inlet port, a second fluid port in fluid communication with the valve body flow passage outlet port, and a third fluid port. The shuttle element is disposed within the shuttle valve housing and is movable between a first position, in which the second fluid port is in fluid communication with the third fluid port and the shuttle element fluidly isolates the first fluid port from the third fluid port, and a second position, in which the first fluid port is in fluid communication with the third fluid port and the shuttle element fluidly isolates the second fluid port from the third fluid port. The fluid-operated switch has a first fluid inlet, a second fluid inlet, a third fluid inlet, an actuator port, and an actuator vent port. The fluid-operated switch first fluid inlet is in fluid communication with the valve body flow passage outlet port, the fluid-operated third fluid inlet is in fluid communication with the shuttle valve housing third fluid port, and the fluid operated switch actuator port is in fluid communication with the valve actuator. The fluid-operated switch is operable to selectively supply pressurized fluid to the actuator via the fluid-operated switch actuator port, and vent the pressurized fluid from the actuator via the fluid-operated switch actuator port and the fluid-operated switch actuator vent port.

Furthermore, other desirable features and characteristics of the valve assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, before proceeding with the detailed description, it should be appreciated that the present invention is not limited to use in conjunction with a specific type of valve. Thus, although the present invention is, for convenience of explanation, depicted and described as being implemented as a fluid-operated butterfly valve, it should be appreciated that it can be implemented as numerous other valve types, and in numerous and varied environments. Moreover, although the preferred operating fluid is air, it should be appreciated that various other gaseous and liquid fluids may also be used.

Figure 1:
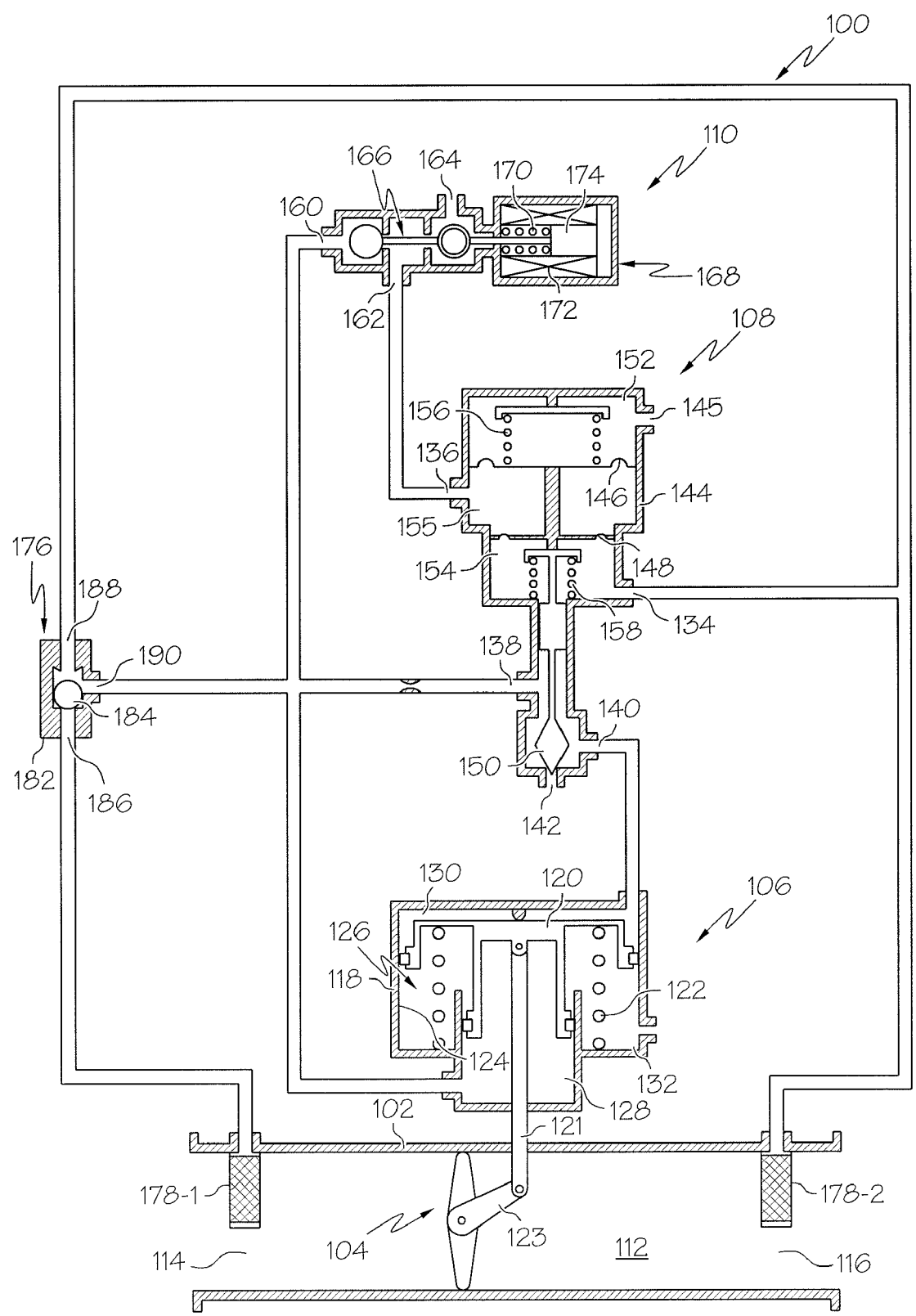
FIG. 1 depicts a detailed schematic representation of an exemplary embodiment of a fluid-operated valve.

Turning now to FIG. 1, a detailed schematic representation of an exemplary embodiment of a fluid-operated valve 100 is shown and will be described in detail. The fluid-operated valve 100 includes a valve body 102, a valve element 104, a valve actuator 106, a fluid-operated switch 108, and a control valve 110. The valve body 102 is adapted to be coupled, and to selectively provide fluid communication, to a non-illustrated pressurized fluid source. In particular, the valve body 102 defines a flow passage 112 having a fluid inlet port 114 adapted to couple to the non-illustrated pressurized fluid source, and a fluid outlet port 116 adapted to couple to one or more downstream systems or components. One non-limiting example of a downstream system is the environmental control system of a commercial airliner.

The valve element 104 is disposed within the flow passage 112 and is moveable between a closed position and an open position, to thereby control pressurized air flow through the flow passage 112. In the closed position, which is shown in FIG. 1, the valve element 104 prevents pressurized air flow from the fluid inlet port 114, through the flow passage 112, to the fluid outlet port 116. Conversely, when the valve element 104 is in the open position, pressurized air may flow through the flow passage 112. The valve element 104 may be implemented using any one of numerous types of valves useful to selectively isolate an upstream pressurized fluid source from a downstream component and/or system. In the depicted embodiment, however, the valve element 104 is a butterfly valve.

The valve actuator 106 is coupled to the valve element 104 and is configured to selectively move the valve element 104 between its open and closed positions. In the depicted embodiment, the valve actuator 106 includes an actuator housing 118, a piston 120, and a piston bias spring 122. The actuator housing 118 has an inner surface 124 that defines a piston chamber 126, within which the piston 120 is movably disposed.

The piston 120, in addition to being movably disposed within the piston chamber 126, is coupled to the valve element 104 via a plurality of links 121, 123. The piston 120 also divides the piston chamber 126 into a closing chamber 128, an opening chamber 130, and a vent chamber 132. The closing chamber 128 and the opening chamber 130 are each in fluid communication with the fluid-operated switch 108, and the vent chamber 132 is in fluid communication with the ambient environment outside the actuator housing 118.

The piston bias spring 122 is disposed within the vent chamber 132 between the actuator housing inner surface 124 and the piston 120. The piston bias spring 122 supplies a force to the piston 120 that urges the valve element 104 toward its closed position. Using the frame of reference depicted in FIG. 1, the piston bias spring 122 biases the piston 120 upwardly, though it will be appreciated that this is merely illustrative.

The fluid-operated switch 108 is in fluid communication with the valve actuator 108 and includes a first fluid inlet 134, a second fluid inlet 136, a third fluid inlet 138, an actuator port 140, and an actuator vent port 142. The fluid-operated switch 108 is operable to selectively supply pressurized fluid to the valve actuator via the actuator port 140, and selectively vent the pressurized fluid from the valve actuator 106 via the actuator port 140 and the actuator vent port 142. To implement this functionality, the fluid-operated switch 108 includes a switch housing 144, a first diaphragm 146, a second diaphragm 148, and a valve element 150.

The first diaphragm 146 is disposed within the switch housing 144 and defines a first chamber 152 that is in fluid communication with a chamber vent port 145. The second diaphragm 148 is also disposed within the switch housing 144 and defines a second chamber 154 that is in fluid communication with first fluid inlet 134. As FIG. 1 also depicts, the second diaphragm 148 is smaller than, and is spaced apart from, the first diaphragm 146. Thus, the first and second diaphragms 146, 148 together define a third chamber 155 that is fluidly isolated from the first and second chambers 152, 154, but is in fluid communication with the second fluid inlet 136.

The valve element 150 is coupled to the first and second diaphragms 146, 148 via suitable hardware, and is movable between a first position and a second position. In the first position, which is the position depicted in FIG. 1, the fluid-operated switch actuator port 140 is in fluid communication with the fluid-operated switch third fluid inlet 138 and is fluidly isolated from the fluid-operated switch actuator vent port 142. In the second position, the fluid-operated switch actuator port 140 is in fluid communication with the fluid-operated switch actuator vent port 142 and is fluidly isolated from the fluid-operated switch third fluid inlet 138.

In the embodiment depicted in FIG. 1, the fluid-operated switch 108 further includes a first spring 156 and a second spring 158. The first spring 156 is disposed within the first chamber 152 and supplies a force to the valve element 150 that urges the valve element 150 toward its first position. The second spring 158 is disposed within the second chamber 154 and supplies a force to the valve element 150 that urges the valve element 150 toward its second position. The first spring 156 is sized and configured such that it supplies a prescribed force. When there is substantially equal pressures within the first, second, and third chambers 152, 154, 155, the valve element 150 will be in its first position.

The control valve 110 includes an inlet 160, an outlet 162, a vent port 164, a control element 166, a solenoid 168, and a solenoid bias spring 170. The control valve inlet 160 is in fluid communication with the fluid-operated switch third fluid inlet 138, and the control valve outlet 162 is in fluid communication with the fluid-operated switch second fluid inlet 136. The vent port 164, as may be seen, is in fluid communication with the ambient environment.

The control element 166 is movable between a first position and a second position. In the depicted embodiment, the control element 166 is implemented as a double ball type valve, though it will be appreciated that this is merely exemplary of a particular preferred embodiment, and that various other types of elements could be used. No matter the particular type of element that is used, when the control element 166 is in the first position, which is the position depicted in FIG. 1, the control valve outlet 162 is in fluid communication with the control valve vent port 164 and not in fluid communication with the control valve inlet 160. Conversely, when the control element 166 is in the second position, the control valve outlet 162 is in fluid communication with the control valve inlet 160 and not in fluid communication with the control valve vent port 164. As will be described in more detail further below, when the control element 166 is moved from the first position to the second position while the valve element 104 is open, the end result is that the valve element 104 will close. In addition, when the valve is subsequently moved from the second position to the first position, the valve element 104 may be re-opened.

The solenoid 168 is coupled to the control element 166, and includes one or more coils 172 and a movable armature 174. As is generally known, when a solenoid coil 172 is energized, it generates a magnetic force that acts on the armature 174, causing it to move. In the depicted embodiment, the solenoid 168 is configured such that when the solenoid coil 172 is energized, the armature 174 moves the control element 166, against the bias force of the solenoid bias spring 170, to the second position. The solenoid bias spring 170, as may be readily ascertained, supplies a force that urges the control element 166 toward the first position.

As FIG. 1 also depicts, the valve assembly 100 additionally includes a shuttle valve 176 and first and second filter elements 178 (e.g., 178-1, 178-2). The filters 178, as may be appreciated, are optional, but if included assist in keeping debris out of the various valve assembly components and interconnecting plumbing. The shuttle valve 176 includes a housing 182 and a shuttle element 184. The shuttle valve housing 182 includes three fluid ports—a first fluid port 186, a second fluid port 188, and a third fluid port 190. The first fluid port 186 is in fluid communication with the valve body flow passage inlet port 114, the second fluid port 188 is in fluid communication with the valve body flow passage outlet port 116, and the third fluid port 190 is in fluid communication with the fluid-operated switch third fluid inlet port 138, the control valve inlet 160, and the actuator closing chamber 128.

The shuttle element 184 is disposed within the shuttle valve housing 182 and is movable between a first position (shown in FIG. 1) and a second position (not shown). In the first position, the second fluid port 188 is in fluid communication with the third fluid port 190, and the shuttle element 184 fluidly isolates the first fluid port 186 from the third fluid port 190. In the second position, the first fluid port 186 is in fluid communication with the third fluid port 190, and the shuttle element 184 fluidly isolates the second fluid port 188 from the third fluid port 190.

Having described the fluid-operated valve assembly 100 from a structural standpoint, a description of how the valve assembly 100 functions will now be provided. In the following discussion, it is presumed that the valve element 104 is initially in the closed position. It is additionally presumed that the solenoid 170 is de-energized, and the control element 166 is thus in the first position.

In order to open the valve element 104, to thereby permit fluid flow through the valve body 102, pressurized fluid may be supplied to either the valve body flow passage inlet 114 or the valve body flow passage outlet 116. Assuming initially that pressurized fluid is supplied to the valve body flow passage inlet 114, this pressurized fluid will move the shuttle element 184 to its second position. As a result, pressurized fluid is supplied, via the shuttle valve housing first and third fluid ports 186, 190, to the fluid-operated switch third fluid inlet port 138, the control valve inlet 160, and the actuator closing chamber 128.

Because the shuttle element 184 is in its second position, the shuttle valve housing second fluid port 188 is fluidly isolated from the pressurized fluid. As such, the fluid-operated switch first fluid inlet 134, and hence the fluid-operated switch second chamber 154, are also fluidly isolated from the pressurized fluid. Moreover, because the control element 166 is in the first position, pressurized fluid does not flow through the control valve 110, and the fluid-operated switch third chamber 155 is vented to the ambient environment via the control valve vent port 164. It may thus be appreciated that the differential pressures across both the first diaphragm 146 and the second diaphragm 148 are essentially zero, and the valve element 150 will be in its first position.

As was noted above, with the valve element 150 in its first position, the fluid-operated switch actuator port 140 is in fluid communication with the fluid-operated switch third fluid inlet 138 and is fluidly isolated from the fluid-operated switch actuator vent port 142. Because the fluid-operated switch actuator port 140 is also in fluid communication with the actuator opening chamber 130, the pressurized fluid flows into, and increases fluid pressure in, the actuator opening chamber 130. When fluid pressure in the actuator opening chamber 130 increases to a level that the fluid force acting on the piston 120 overcomes the spring force supplied from the piston bias spring 122 and the fluid force from the fluid pressure in the closing chamber 128, the piston 120 will moves downwardly (using the frame of reference of FIG. 1). As the piston 120 moves downwardly, it moves the valve element 104, via the links 121, 123, to the open position. Pressurized fluid may then flow through the valve body 102.

It was noted above that the valve element 104 may also be moved from its closed position to its open position by supplying pressurized fluid to the valve body flow passage outlet 116. Hence, before describing additional valve assembly operations, this manner of opening the valve element 104 will be described. With pressurized fluid supplied to the valve body flow passage outlet 116, the shuttle element 184 will move to its first position. Thus, pressurized fluid is supplied, via the shuttle valve housing second and third fluid ports 188, 190, to the fluid-operated switch third fluid inlet port 138, the control valve inlet 160, and the actuator closing chamber 128.

Because the shuttle element 184 is in its first position, the shuttle valve housing first fluid port 186 is fluidly isolated from the pressurized fluid. However, the fluid-operated switch first fluid inlet 134, and hence the fluid-operated switch second chamber 154, are fluidly coupled to receive the pressurized fluid. Here too, because the control element 166 is in the first position, pressurized fluid does not flow through the control valve 110, and the fluid-operated switch third chamber 155 is vented to the ambient environment via the control valve vent port 164. It may thus be appreciated that the differential pressure across the first diaphragm 146 is essentially zero, while the differential pressure across the second diaphragm 148 is non-zero and supplies a force that urges the valve element toward its second position. It is noted, however, that the sizing of the first and second diaphragms 146, 148 and the first and second springs 156, 158 are such that the valve element 150 will remain in its first position unless a predetermined fluid pressure in the second chamber 154 is reached.

Once again, with the valve element 150 in its first position, the fluid-operated switch actuator port 140 is in fluid communication with the fluid-operated switch third fluid inlet 138 and is fluidly isolated from the fluid-operated switch actuator vent port 142. Because the fluid-operated switch actuator port 140 is also in fluid communication with the actuator opening chamber 130, the pressurized fluid flows into, and increases fluid pressure in, the actuator opening chamber 130. When fluid pressure in the actuator opening chamber 130 increases to a level that the fluid force acting on the piston overcomes the spring force supplied from the piston bias spring 122 and the fluid force from the fluid pressure in the closing chamber 128, the piston 120 moves downwardly (using the frame of reference of FIG. 1). As the piston 120 moves downwardly, it moves the valve element 104, via the links 121, 123, to the open position. Pressurized fluid may then flow through the valve body 102.

The valve assembly 100 is additionally configured to automatically move the valve element 104 from an open position to the closed position, if fluid pressure downstream of the valve element 104 exceeds a predetermined pressure value. This automated closing is preferably implemented by electrically energizing the control valve solenoid 170. In addition, in the highly unlikely event the solenoid 170 is not energized, or is not energized in a sufficiently timely manner, the valve assembly 100 is configured to automatically start closing the valve element 104 and thereby limit downstream fluid pressure. The manner in which each of these closing operations may occur will now be described.

With the valve element 104 in its open position, if downstream fluid pressure reaches the predetermined pressure value the control valve solenoid 170 is preferably energized. Though not described above or depicted in FIG. 1, it will be appreciated that downstream fluid pressure may be sensed by a suitable sensing device, which supplies a pressure signal representative of the downstream fluid pressure to a suitable control device. The control device, in response to the pressure signal, may selectively energize the control valve solenoid 170 when the pressure signal indicates that the predetermined pressure value is reached or exceeded.

No matter the specific manner in which the selective energizing of the control valve solenoid 170 is implemented, upon it being energized the control element 166 is moved, as described previously, to its second position. With the control element 166 in its second position, the control valve outlet 162 is in fluid communication with the control valve inlet 160, and is no longer in fluid communication with the control valve vent port 164. Hence, the third chamber 155 is no longer in fluid communication with the ambient environment, but is now in fluid communication with the control valve inlet port 160. The fluid pressure in the third chamber 155 supplies a force to the first diaphragm 146 counter to the spring force supplied by the first spring 156. The relative sizing of the first and second diaphragms 146, 148 and the relative sizing of the first and second springs 156, 158 are selected such that when the third chamber 155 is pressurized to a predetermined pressure, the overall force acting on the valve element 150 will cause the valve element to move to its second position.

With the valve element 150 in its second position, the fluid-operated switch actuator port 140 is in fluid communication with the fluid-operated switch actuator vent port 142 and is fluidly isolated from the fluid-operated switch third fluid inlet 138. As a result, the fluid pressure in the actuator opening chamber 130 is vented to the ambient environment, and the piston bias spring 122 and fluid pressure in the actuator closing chamber 128 move the piston 120 upwardly (using the frame of reference of FIG. 1). As the piston 120 moves upwardly, it moves the valve element 104, via the links 121, 123, to the closed position.

In the highly unlikely event the solenoid 170 is not energized, or is not energized in a sufficiently timely manner, upon the downstream fluid pressure reaching or exceeding the predetermined pressure value, the fluid-operated switch 108 will close (or at least start to close) the valve element 104 and limit downstream pressure. For example, if the predetermined pressure value is reached and the solenoid 170 is not energized, it may be seen that the first and third chambers 152, 155 in the fluid-operated switch 108 will be at the ambient environment pressure, whereas the second chamber 154 in the fluid-operated switch 108 will be at the downstream fluid pressure. The differential fluid pressure across the first diaphragm 146 will thus be zero, while the differential fluid pressure across the second diaphragm 148 will be non-zero. The first and second diaphragms 146, 148 and the first and second springs 156, 158 are sized such that the force on the second diaphragm 148 resulting from the non-zero differential fluid pressure is sufficient to cause the valve element 150 to move to the second position, or at least partially out of its first position.

When the valve element 150 moves out of its first position, the fluid-operated switch actuator port 140 is in fluid communication with the fluid-operated switch actuator vent port 142. As a result, the fluid pressure in the actuator opening chamber 130 is vented to the ambient environment, and the piston bias spring 122 and fluid pressure in the actuator closing chamber 128 move the piston 120 upwardly (using the frame of reference of FIG. 1). As the piston 120 moves upwardly, it moves the valve element 104, via the links 121, 123, to the closed position (or at least toward the closed position).

Figure 2:
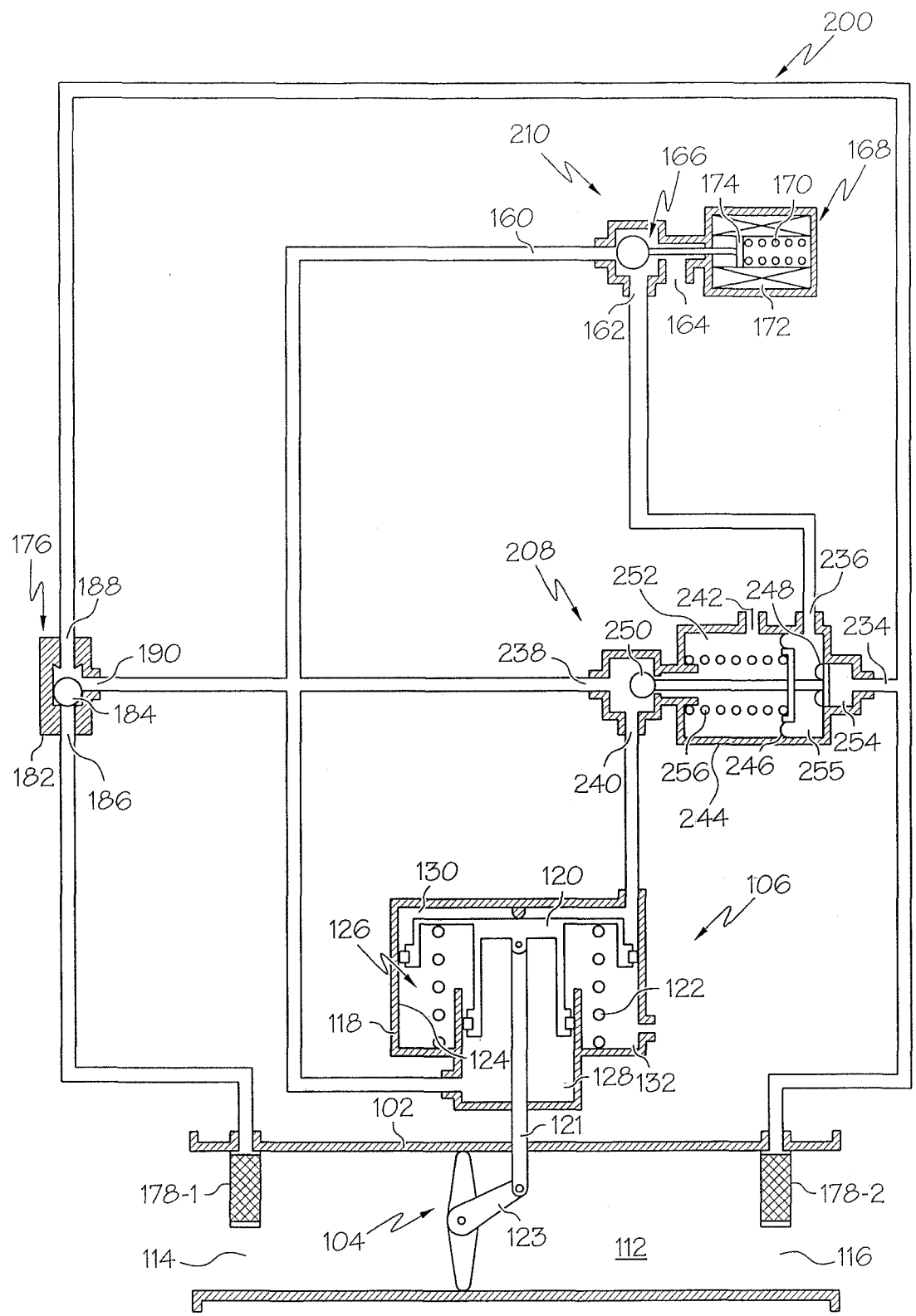
FIG. 2 a detailed schematic representation of an exemplary alternative embodiment of a fluid-operated valve.

The valve assembly 100 depicted in FIG. 1 is exemplary of one particular preferred embodiment. Another embodiment is depicted in FIG. 2. This valve assembly 200 is configured substantially similar to that of FIG. 1, but with a differently configured fluid-operated switch 208 and a slightly modified control valve 210. All other components of the alternative valve assembly 200 are substantially identical to the valve assembly 100 depicted in FIG. 1, and like reference numerals in FIG. 2 refer to like components in FIG. 1. For brevity, the like components of these two embodiments will not be once again described. Moreover, it is clear to the skilled artisan that the only difference between the control valve 210 of FIG. 2 is that the control element 166 is implemented as a single ball type valve, rather than a double ball type valve. As such, its configuration and function will not be further described.

As noted above, the only component of the alternative valve assembly 200 that differ significantly from that of FIG. 1 is the fluid-operated switch 208. The fluid-operated switch 208, similar to the previous embodiment, includes a first fluid inlet 234, a second fluid inlet 236, a third fluid inlet 238, an actuator port 240, an actuator vent port 242, a switch housing 244, a first diaphragm 246, a second diaphragm 248, and a valve element 250. The fluid-operated switch 208, like the previous embodiment, is also operable to selectively supply pressurized fluid to the valve actuator 106 via the actuator port 240, and selectively vent the pressurized fluid from the valve actuator 106 via the actuator port 240 and the actuator vent port 242.

The first diaphragm 246 is disposed within the switch housing 244 and defines a first chamber 252 that is in fluid communication with the actuator vent port 242. The second diaphragm 248 is also disposed within the switch housing 244 and defines a second chamber 254 that is in fluid communication with first fluid inlet 234. As FIG. 2 also depicts, the second diaphragm 248 is smaller than, and is spaced apart from, the first diaphragm 246. Thus, the first and second diaphragms 246, 248 together define a third chamber 255 that is fluidly isolated from the first and second chambers 252, 254, but is in fluid communication with the second fluid inlet 236.

The valve element 250 is coupled to the first and second diaphragms 246, 248 via suitable hardware, and is movable between a first position and a second position. In the first position, which is the position depicted in FIG. 2, the fluid-operated switch actuator port 240 is in fluid communication with the fluid-operated switch third fluid inlet 238 and is fluidly isolated from the fluid-operated switch actuator vent port 242. In the second position, the fluid-operated switch actuator port 240 is in fluid communication with the fluid-operated switch actuator vent port 242 and is fluidly isolated from the fluid-operated switch third fluid inlet 238.

Unlike the embodiment depicted in FIG. 1, the fluid-operated switch 208 depicted in FIG. 2 includes only a single spring 256. The spring 256 is disposed within the first chamber 252 and supplies a force to the valve element 250 that urges the valve element 250 toward its first position. It should be understood that the first and second diaphragms 246, 248 and the spring 256 are sized to implement the same functionality as the fluid-operated switch 108 depicted in FIG. 1 and described above.

The operation of the valve assembly 200 of FIG. 2, as will be readily apparent to the skilled artisan, is substantially identical to that of the valve assembly 100 of FIG. 1. Therefore, the operation of this valve assembly 200 need not, and thus will not, be repeated.

The valve assemblies 100, 200 depicted and described herein may be used in any one of numerous fluid systems for any one of numerous purposes. One non-limiting example is as an over-pressure shutoff-valve in an aircraft environmental control system. In such an implementation, the valve assembly 100, 200 may be configured to open upon the application of a fluid pressure of, for example, about 20 psig from either upstream or downstream of the valve element 104. The valve assembly 100, 200 will close upon energizing the solenoid 170. Should downstream fluid pressure increase above a predetermined pressure value, the valve assembly 100, 200 will start to close and, if the high fluid pressure originates upstream of the valve element 104, will limit downstream fluid pressure to another predetermined pressure value. While closed, the upstream fluid pressure may build as high as about 120 psig and the valve assembly 100, 200 will still open if the solenoid 170 is de-energized. Though not depicted or described, in some embodiments the valve element 104 may be locked in the open position.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A valve assembly, comprising:
    a valve body defining a flow passage having at least an inlet port and an outlet port;
    a valve element disposed at least practically within the flow passage and movable between an open position and a closed position;
    a valve actuator coupled to the valve element and responsive to pressurized fluid supplied thereto and vented therefrom to move the valve element between the open position and the closed position, respectively;
    a fluid-operated switch including a first fluid inlet, a second fluid inlet, a third fluid inlet, an actuator port, and an actuator vent port, the fluid-operated switch in fluid communication with the valve actuator and operable to selectively (i) supply pressurized fluid to the actuator via the actuator port and (ii) vent the pressurized fluid from the actuator via the actuator port and the actuator vent port; and
    a shuttle valve housing having a first fluid port in fluid communication with the valve body flow passage inlet port, a second fluid port in fluid communication with the valve body flow passage outlet port, and a third fluid port in fluid communication with the fluid-operated switch third fluid inlet port;
    a shuttle element disposed within the shuttle valve housing and movable between (i) a first position, in which the second fluid port is in fluid communication with the third fluid port and the shuttle element fluidly isolates the first fluid port from the third fluid port, and (ii) a second position, in which the first fluid port is in fluid communication with the third fluid port and the shuttle element fluidly isolates the second fluid port from the third fluid port;
    a control valve having an inlet, an outlet, a vent port, and a control element selectively movable between a first position and a second position, the control valve inlet in fluid communication with the fluid-operated switch third fluid inlet, the control valve outlet in fluid communication with the fluid-operated switch second fluid inlet,
    wherein:
        when the control element is in the first position, the control valve outlet is in fluid communication with the control valve vent port and not in fluid communication with the control valve inlet, and
        when the control element is in the second position, the control valve outlet is in fluid communication with the control valve inlet and not in fluid communication with the control valve vent port.

2. The valve assembly of claim 1, further comprising:
    a solenoid coupled to the control element, the solenoid adapted to receive an electrical signal and operable, in response thereto, to move from a first position to a second position, to thereby move the control element from its first position to its second position.

3. The valve assembly of claim 2, further comprising:
    a spring coupled to the control element and supplying a force thereto that urges the control element toward its first position.

4. The valve assembly of claim 1, wherein the fluid-operated switch first fluid inlet is in fluid communication with the shuttle valve housing second fluid port and the valve body flow passage outlet port.

5. The valve assembly of claim 1, wherein the valve actuator includes:
    an actuator housing having an inner surface that defines a piston chamber;
    a piston disposed within the piston chamber and coupled to the valve, the piston dividing the piston chamber into a closing chamber, an opening chamber, and a vent chamber, the closing chamber in fluid communication with the fluid-operated switch third fluid inlet, the opening chamber in fluid communication with the fluid-operated switch actuator port, the vent chamber in fluid communication with the fluid-operated switch vent port; and
    a spring disposed within the vent chamber between the actuator housing inner surface and the piston, the spring supplying a force to the piston that urges the valve toward its closed position.

6. The valve assembly of claim 1, wherein the fluid-operated switch comprises:
    a switch housing;
    a first diaphragm disposed within the switch housing and defining a first chamber;
    a second diaphragm disposed within the switch housing and defining a second chamber, the second diaphragm smaller than the first diaphragm and spaced apart therefrom to define a third chamber that is fluidly isolated from the first and second chambers; and
    a valve element coupled to the first and second diaphragms and movable between a first position, in which the fluid-operated switch actuator port is in fluid communication with the fluid-operated switch third fluid inlet and is fluidly isolated from the fluid-operated switch actuator vent port, and a second position, in which the fluid-operated switch actuator port is in fluid communication with the fluid-operated switch actuator vent port and is fluidly isolated from the fluid-operated switch third fluid inlet.

7. The valve assembly of claim 6, wherein:
    the fluid-operated switch first fluid inlet is in fluid communication with the second chamber;
    the fluid-operated switch second fluid inlet is in fluid communication with the third chamber; and the fluid-operated switch further includes a chamber vent port that is in fluid communication with the first chamber.

8. The valve assembly of claim 7, wherein the fluid-operated switch further comprises:
a spring disposed within the first chamber and supplying a force to the valve element that urges the valve element toward its first position.

9. The valve assembly of claim 8, wherein the fluid-operated switch further comprises:
a second spring disposed within the second chamber and supplying a force to the valve element.

10. A valve body defining a flow passage having at least an inlet port and an outlet port;
a valve element disposed at least partially within the flow passage and moveable between an open position and a closed position;
a valve actuator coupled to the valve element and responsive to pressurized fluid supplied thereto and vented therefrom to move the valve element between open position and the closed position, respectively;
a shuttle valve housing having a first fluid port in fluid communication with the valve body flow passage inlet port, a second fluid port in fluid communication with the valve body flow passage outlet port, and a third fluid port;
a shuttle element disposed within the shuttle valve housing and movable between (i) a first position, in which the second fluid port is in fluid communication with the third fluid port and the shuttle element fluidly isolates the first fluid port from the third fluid port, and (ii) a second position, in which the first fluid port is in fluid communication with the third fluid port and the shuttle element fluidly isolates the second fluid port from the third fluid port;
a fluid-operated switch having a first fluid inlet, a second fluid inlet, a third fluid inlet, an actuator port, and an actuator vent port, the fluid-operated switch first fluid inlet in fluid communication with the valve body flow passage outlet port, the fluid-operated third fluid inlet in fluid communication with the shuttle valve housing third fluid port, the fluid operated switch actuator port in fluid communication with the valve actuator, the fluid-operated switch operable to selectively (i) supply pressurized fluid to the actuator via the fluid-operated switch actuator port and (ii) vent the pressurized fluid from the actuator via the fluid-operated switch actuator port and the fluid-operated switch actuator vent port; and
a control valve having an inlet, an outlet, a vent port, and a control element selectively movable between a first position and a second position, the control valve inlet in fluid communication with the fluid-operated switch second fluid inlet, the control valve outlet in fluid communication with the fluid-operated switch third fluid inlet, wherein:
when the control element is in the first position, the control valve outlet is in fluid communication with the control valve vent port and not in fluid communication with the control valve inlet, and
when the control element is in the second position, the control valve outlet is in fluid communication with the control valve inlet and not in fluid communication with the control valve vent port.

11. The valve assembly of claim 10, further comprising:
a solenoid coupled to the control element, the solenoid adapted to receive an electrical signal and operable, in response thereto, to move from a first position to a second position, to thereby move the control element from its first position to its second position.

12. The valve assembly of claim 11, further comprising:
a spring coupled to the control element and supplying a force thereto that urges the control element toward its first position.

13. The valve assembly of claim 10, wherein the valve actuator includes:
an actuator housing having an inner surface that defines a piston chamber;
a piston disposed within the piston chamber and coupled to the valve, the piston dividing the piston chamber into a closing chamber, an opening chamber, and a vent chamber, the closing chamber in fluid communication with the fluid-operated switch third fluid inlet, the opening chamber in fluid communication with the fluid-operated switch actuator port, the vent chamber in fluid communication with the fluid-operated switch vent port; and
a spring disposed within the vent chamber between the actuator housing inner surface and the piston, the spring supplying a force to the piston that urges the valve toward its closed position.

14. The valve assembly of claim 10, wherein the fluid-operated switch comprises:
a switch housing;
a first diaphragm disposed within the switch housing and defining a first chamber;
a second diaphragm disposed within the switch housing and defining a second chamber, the second diaphragm smaller than the first diaphragm and spaced apart therefrom to define a third chamber that is fluidly isolated from the first and second chambers;
a valve element coupled to the first and second diaphragms and movable between a first position, in which the fluid-operated switch actuator port is in fluid communication with the fluid-operated switch third fluid inlet and is fluidly isolated from the fluid-operated switch actuator vent port, and a second position, in which the fluid-operated switch actuator port is in fluid communication with the fluid-operated switch actuator vent port and is fluidly isolated from the fluid-operated switch third fluid inlet.

15. The valve assembly of claim 14, wherein:
the fluid-operated switch first fluid inlet is in fluid communication with the second chamber;
the fluid-operated switch second fluid inlet is in fluid communication with the third chamber; and
the fluid-operated switch further includes a chamber vent port that is in fluid communication with the first chamber.

16. The valve assembly of claim 15, wherein the fluid-operated switch further comprises:
a spring disposed within the first chamber and supplying a force to the valve element that urges the valve element toward its first position.

17. The valve assembly of claim 16, wherein the fluid-operated switch further comprises:
a second spring disposed within the second chamber and supplying a force to the valve element.

* * * * *